United States Patent [19]

Sharpe, Jr.

[11] Patent Number: 4,647,382
[45] Date of Patent: Mar. 3, 1987

[54] FLOCCULATION OF HIGH SOLIDS MINERAL SLURRIES

[76] Inventor: Andrew J. Sharpe, Jr., Star Rte. Box 130, Comfort, W. Va. 25049

[21] Appl. No.: 744,020

[22] Filed: Jun. 12, 1985

[51] Int. Cl.$^4$ .............................................. C02F 1/56
[52] U.S. Cl. ............................... 210/710; 106/288 B; 209/5; 210/734; 210/778; 501/148
[58] Field of Search ........................ 106/288 B, 308 B; 209/5; 210/710, 725, 727, 728, 733, 734, 778; 501/148

[56] References Cited

U.S. PATENT DOCUMENTS

| | | | |
|---|---|---|---|
| 3,539,003 | 11/1970 | Bidwell | 106/288 B |
| 3,692,673 | 9/1972 | Hoke | 210/728 |
| 3,737,333 | 6/1973 | Sawyer, Jr. | 106/288 B |
| 3,879,283 | 4/1975 | Mercade | 106/288 B |
| 4,186,027 | 1/1980 | Bell et al. | 106/288 B |
| 4,372,653 | 8/1982 | Halverson | 210/734 |
| 4,509,987 | 4/1985 | Farrar et al. | 241/16 |

Primary Examiner—Peter Hruskoci

[57] ABSTRACT

Aqueous mineral slurries containing 10% by weight or more of finely divided mineral solids are flocculated prior to dewatering and/or thickening, and prepared for redispersion, by treating the slurries with polymers comprising at least about 1% by weight 2-acrylamido-2-methyl propyl sulfonic acid copolymerized with acrylamide and/or other suitable water-soluble monomers. The polymers must have a Brookfield viscosity of at least 7000 cps at 7.5% concentration in water. Flocculation of the mineral slurries with these polymers also provides improved re-dispersibility of the dewatered mineral in the filter cake. During redispersion, additional dry mineral may be added to obtain a final solids content as high as 70% or more. The Brookfield viscosity of the final high solids slurry comprising a significant portion of filter cake treated with the flocculants of this invention is lower than that of untreated material.

12 Claims, No Drawings

FLOCCULATION OF HIGH SOLIDS MINERAL SLURRIES

BACKGROUND OF THE INVENTION

This invention relates to an improved process for flocculating and thickening and/or dewatering aqueous pigment slurries containing 10% by weight or more of pigment, which provides improved dewatering and simultaneously provides improved redispersion of the pigment after filtering it. More particularly, this invention relates to the use of an anionic copolymer flocculant comprising at least about 1% 2-acrylamido-2-methyl propyl sulfonic acid and acrylamide for treating finely divided minerals such as kaolin clay, calcium carbonate, calcium sulfate, and the like, to purify, filter, dewater, redisperse, and prepare them for shipment.

Flocculants are reagents which are added to suspensions of solids to cause the solids to agglomerate (or floc) and settle or dewater more efficiently. A highly effective type of flocculant is the polymeric type which may be prepared in numerous variations. Polymeric water-soluble flocculants may be nonionic, anionic, cationic, or amphoteric. The particular type of flocculant to be used in a given application may depend upon the nature of the surface of the suspended solids and other factors such as pH.

Acrylamide monomer, a nonionic, is a basic building block for water soluble polymers because of its price and availability. It may be homopolymerized to obtain nonionic polymers. It is frequently copolymerized with one or more monomers containing primary, secondary, tertiary, or quaternary amine groups to obtain cationic flocculants. Similarly, it may be copolymerized with acrylic acid, 2-acrylamido-2-methyl propyl sulfonic acid and other monomers containing acid groups to obtain anionic flocculants.

Water soluble copolymers containing sulfonate groups are known in the art to be effective flocculants. U.S. Pat. No. 3,692,673 to Hoke teaches the use of polymers of 2-acrylamido-2-methyl propyl sulfonic acid and their salts as flocculants particularly for use in clarification of surface water and municipal sewage. While Hoke uses a low solids suspension of kaolin (200 ppm) to approximate surface water turbidity the present invention is different in that Hoke works with a 200 ppm suspension of kaolin whereas the present invention is concerned with 10% or more mineral slurries (100,000 ppm or more). Second, the objective of the work reported in Hoke is supernate clarity, i.e. improved solids removal and/or improved settling rate, whereas the present invention involves thickening and/or dewatering. Thickening or dewatering, i.e. the creation of a compact filter cake containing as little water as possible, places different and more stringent requirements on a flocculant than the separation of solids from water without regard to the condition of the filter cake. In U.S. Pat. No. 3,617,572 Monagle teaches the use of copolymers of acrylamide and an alkali metal salt of vinyl sulfonic acid as effective flocculants for improved settling of clays, including kaolin, which are present as impurities in concentrated salt solutions. Again, Monagle is concerned with improved solids capture, i.e. clarity or settling rate, which is distinct from the objective of the instant invention. Second, it is recognized in the art that vinyl sulfonate polymerizes very, very sluggishly compared to acrylamide. As a result, copolymers of vinyl sulfonic acid and acrylamide are very likely block-like. Conversely, 2-acrylamido-2-methyl propyl sulfonic acid (AMPS) and its salts polymerize at a rate only slightly less than that of acrylamide; acrylamide/AMPS copolymers are approximately random copolymers. Due to the significant difference in intra-molecular structure, any performance results of VSA/AM copolymers would not anticipate or predict the results to be obtained with AMPS/AM copolymers. Finally, in U.S. Pat. No. 4,342,653, Halverson teaches the use of copolymers of 99–65 mole percent acrylamide and 1–35 mole percent 2-acryl-amido-2-methyl propyl sulfonic acid and having Brookfield viscosities of at least 2.0 cps at 0.08% concentration in one normal NaCl as effective flocculants especially useful for treating phosphate slimes. Halverson also describes the use of AMPS/AM copolymers as flocculants for humate wastes, for processing streams encountered in the copper, uranium, potash and coal industries. Halverson describes the use of AMPS/AM polymers as coagulant aids, in conjunction with alum, for color removal. All the performance data reported by Halverson pertains to improved settling rate or reduction of the volume of the underflow.

The reader may also be interested in Engelhardt et al U.S. Pat. No. 4,357,245, which describes a drilling mud containing 2-acrylamido-2-methylpropane-3-sulfonic acid copolymerized with acrylamide, and the prior art reviewed therein. See also Engelhardt et al U.S. Pat. No. 4,309,523, also describing a drilling mud, and Lim et al U.S. Pat. Nos. 4,077,930 and 4,147,681 which describe self-inverting emulsions of similar polymers. Polymers similar to the ones I employ have also been used by Adams et al in U.S. Pat. No. Re. 29,595, Randin in U.S. Pat. No. 4,296,016, and Doggett et al U.S. Pat. No. 4,136,078 for various purposes.

Despite these and many other teachings, no one has yet developed a flocculant which will effectively flocculate aqueous pigment slurries such as Kaolin clays for dewatering or thickening and subsequently permit effective redispersion of the thickened or dewatered slurry to obtain a high solids, e.g. 60–70% or more solids, low viscosity product. This is not too surprising when one considers that flocculation and dispersion of solids in a slurry are totally opposite phenomena. A flocculant causes the particles to agglomerate into larger clumps which settle or dewater more rapidly. A dispersant functions by causing the individual particles to repel—the opposite mechanism.

Approximately 5 to 6 million tons of kaolin clay per year are mined, processed and shipped from Georgia alone. The clay is usually mined by the open pit method. It is then slurried in water to about 20–30% solids, dispersed with various combinations of inorganic and organic dispersants to maintain a low (almost water-like) viscosity, and processed. Processing includes removal of iron and other magnetic impurities, removal of sand and silt, bleaching for whiteness and brightness, and, finally, dewatering, usually in vacuum rotary filters, to obtain a filter cake which is 50–60% solids. Part of the filter cake is spray dried, packaged and sold as solid dry clay. A portion of the filter cake is spray dried and blended back with the remaining filter cake to obtain a 70% solids aqueous slurry. Additional dispersants may be added to the 70% slurry as needed to obtain a final Brookfield viscosity of less than 1000 cps (preferably less than 500 cps). This low viscosity 70% slurry is then shipped in bulk to the customer.

While many high molecular weight organic polymers—cationic, anionic and nonionic—have been shown to be capable of flocculating kaolin clay in a satisfactory manner, none has been able to do so without having deleterious effects in the blending back or redispersing of the 70% slurry. The presence of the flocculant in the slurry typically will work against the desired effect of the dispersant, typically a low molecular weight polyacrylic acid, to disperse the solids and lower the viscosity. The necessary low viscosity for the final product has not been achieved, and a solids content higher than 60% has not yet been attained, to my knowledge.

SUMMARY OF THE INVENTION

The present invention employs certain polymeric flocculants for thickening or dewatering aqueous pigment, clay or mineral slurries containing 10% by weight or more pigment, clay or mineral (collectively mineral) wherein the flocculated mineral may be re-dispersed after the separation process by normal means such as addition of low molecular weight anionic polymers with mixing. The polymers of the instant invention simultaneously provide increased throughput and increased solids content in the product stream of the dewatering operation. One skilled in the art will recognize that this result is very surprising and very unexpected. It is generally accepted in the art that a polymer which will improve filter throughput will normally cause at least a small decrease in product stream (cake) solids. Conversely a polymer which will improve product stream solids may be expected to cause at least a small decrease in throughput. Further, the polymers of the present invention flocculate the subject aqueous mineral slurries for thickening and/or dewatering through a mechanism as yet not understood, which permits the flocculated mineral slurry to be redispersed to a high solids, low viscosity aqueous slurry. This result is highly surprising and unexpected. The flocculants of the present invention interact with the system in the subsequent redispersing operation to provide lower viscosity higher solids slurries than can be obtained using unflocculated slurry. In fact, the use of 0.2 lbs/ton of a 7.5% solution (0.015 lb/ton) of the polymers of the instant invention will permit reduction of the dispersant dosage during the redispersal operation by at least 1.0 lb/ton.

DETAILED DESCRIPTION OF THE INVENTION

The instant invention employs flocculants which effectively enhance the dewatering operations during the processing of pigment slurries and which also permit outstanding solids concentrations and viscosities on redispersing. The process of the instant invention, in contrast to the use of flocculants described in the prior art, simultaneously provides increased throughput and increased solids in the product stream of the dewatering operation and, subsequently, provides outstanding redispersion of said pigments (pigments, clay and minerals are used interchangeably herein) with or without simultaneous use of common techniques for redispersing, e.g. the addition of low molecular weight anionic polymers and/or phosphonates, for example, and/or mixing thoroughly after the dewatering operation. My process has shown surprising utility in dewatering and re-dispersing Kaolin clay. These same advantages may be realized in processing calcium carbonate, calcium sulfate (gypsum) and in other operations where finely ground solids must be dewatered and subsequently redispersed.

The flocculants of the instant invention are anionic polymeric flocculants comprising from about 50 to about 99 mole percent of repeating units derived from acrylamide or other suitable monomer and from about 1 to about 50 mole percent repeating units derived from 2-acrylamido-2-methyl propyl sulfonic acid and/or its neutralized salts. More preferably the polymers contain from about 1 to 25 mole percent of 2-acrylamido-2-methyl propyl sulfonic acid and from 99 to 75 mole percent of acrylamide. The acrylamide portion of the polymer may be replaced, up to about ten (10) mole percent by acrylic acid either by monomer addition in the original synthesis of the polymer or by hydrolysis, as is known in the art. Other compatible water-soluble monomers, such as n-vinyl pyrrolidone, methacrylic acid, vinyl sulfonate, and maleic acid may also be employed in amounts up to about 10% of the overall monomer. The essential monomer, 2-acrylamido-2-methyl propyl sulfonic acid, has the formula

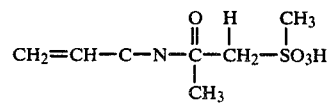

The hydrogen in the sulfonate group may be substituted with any common readily soluble cation such as potassium, sodium, lithium, or ammonium.

The anionic flocculants of the instant invention must have a Brookfield viscosity of at least 7000 cps when measured in a 7.5% aqueous solution of said polymers.

EXAMPLES

The following specific examples are intended to illustrate certain aspects of the present invention; they are not to be construed as limitations thereof. Standard laboratory filter leaf tests were completed to demonstrate the improved filter operation attainable by using very small quantities of the polymers of the instant invention. As is known in the art, the filter leaf test employs a hollow, more or less conical, plastic device which is connected to a vacuum pump or aspirator and which is covered with a piece of filter cloth, preferably the same type of cloth used commercially for the slurry being tested. The filter leaf (the conical device and the cloth) is then immersed in a container of slurry for a predetermined number of seconds approximating immersion on the commercial filter, and kept under a vacuum to draw the slurry to the cloth. The filter leaf is then inverted for another predetermined time (in the following examples the times were 25 and 120 seconds respectively) under vacuum to dry. The cake obtained on the cloth is then scraped into a container and weighed. The cake is dried overnight at a standard temperature, e.g. 105 degrees C., and reweighed. Yield of wet filter cake from the lab filter is determined as grams per square inch. This result is converted to pounds per square foot to predict performance on the full scale filter. Cake solids is calculated from the dry weight and wet weight of the collected filter cakes. The cakes from 4 filter leaf evaluations were combined to obtain each result listed below. In Table I, bowl and bowl plus clay weights are expressed in grams. The yield of pounds per square foot per hour is calculated from the lab filter yield which is in terms of grams per square inch, taking into account the known revolutions per hour and total square footage of filter area for the full-scale commercial filter. Determinations were completed for the control and each polymer dosage. The multiple determinations improve the statistical significance of the results considerably. A very fine (very small particle size, e.g. 97% <2 micron) grade of Kaolin clay which is extremely difficult to filter was used in these evaluations.

Other conditions for these evaluations are summarized below:

| | |
|---|---|
| feed solids | 20.35 |
| feed temperature | 68 degrees F. |
| feed pH | 3.46 |
| inches vacuum | 25 |
| CFM cloth | 3.2 |
| cloth backing | close knit |
| seconds submergence | 25 |
| seconds drying | 120 |
| filter rev/hr | 24 |
| polymer | AJS-13 (90% by weight acrylamide/10% 2-acrylamido-2-methyl propyl sulfonic acid, 7.5% active, having a Brookfield viscosity of 31,500 cps Sp 6 RV @ 20 RPM |

TABLE I

| Polymer dosage | Bowl wt | Bowl + Wet Clay | Bowl + Dry Clay | Yield lb/sq ft/hr | Yield ton/ hr | Cake solids (%) | Filtrate solids (%) | mls filtrate |
|---|---|---|---|---|---|---|---|---|
| 0 | 174.34 | 262.40 | 221.38 | 5.96 | 9.10 | 53.42 | 0.97 | 150 |
| (control) | 179.11 | 269.29 | 227.15 | 6.09 | 9.29 | 53.27 | 0.84 | 148 |
|  | 179.42 | 265.85 | 226.45 | 5.96 | 9.10 | 54.41 | 0.86 | 142 |
|  |  | mean |  | 6.00 | 9.10 | 53.70 | 0.89 |  |
| 0.2 lbs | 177.02 | 270.67 | 228.73 | 6.55 | 10.00 | 55.22 | 0.74 | 158 |
| — | 182.31 | 278.78 | 235.39 | 6.73 | 10.27 | 55.02 | 0.83 | 162 |
| ton | 183.81 | 279.18 | 236.28 | 6.65 | 10.15 | 55.02 | 0.80 | 160 |
|  |  | mean |  | 6.64 | 10.14 | 55.09 | 0.79 |  |
| 0.3 lbs | 178.12 | 274.37 | 231.51 | 6.76 | 10.33 | 55.47 | 0.95 | 166 |
| — | 173.93 | 272.09 | 228.09 | 6.86 | 10.48 | 55.18 | 0.89 | 168 |
| ton | 178.12 | 276.21 | 232.42 | 6.88 | 10.51 | 55.36 | 0.85 | 168 |
|  |  | mean |  | 6.84 | 10.44 | 55.33 | 0.90 |  |

The results of Table I clearly show that significant increases in filter throughput can be achieved with very small dosages of the polymers of the instant invention. Further, cake solids are also significantly improved. Even further, the dosages required to achieve these improvements are so small as to be considered minuscule: 0.2 pound per ton of 7.5% active product equals 0.015 pounds active pounds product per ton of clay produced and provides 10.7% increase in throughput and 2.6% increase in cake solids. 0.3 pounds per ton equals 0.0225 active pounds of product per ton of clay and provides a 14% increase in filter throughput and 3.0% increase in cake solids. Particularly significant is the fact that a flocculant which is this effective has no detrimental effect on re-dispersion of the filter cake to obtain a low viscosity slurry.

Persons skilled in the art will recognize that the above results presented in Table I represent a departure from the prior art teachings. One would normally predict a loss in filter cake solids or, at best, maintaining approximately the same cake solids when employing a flocculant to improve filter throughput. This is based on the accepted logic that in order to release water faster, the filter cake must be porous. Conversely, teachings of the art to date would predict a loss in filter throughput in situations where a flocculant increased filter solids. This is based on the accepted principle that a more dense, more closely packed filter cake would release water more slowly. Thus, a simultaneous improvement in throughput and cake solids would not be predicted based on the prior art.

The same kaolin clay which was used in Table I was re-dispersed in the laboratory to simulate preparation for shipment. The weighed, dried filter cake from each experiment was added to sufficient water and dispersant to obtain approximately 70% clay solids. The level of dispersant ("60–40", a mixture of 60% soda ash and 40% a 43% solution of low molecular weight polyacrylic acid) is noted in Table II. The mixture was then placed on a Hobart lab mixer and mixed for 10 minutes. The Brookfield and Hercules viscosity of the redispersed slurry was then measured and recorded. Results of the redispersing procedure are given in Table II. In each measurement of Brookfield viscosity, the spindle 1 RV was used and the speed was set at 20 revolutions per minute. For the Hercules measurement, the A bob and 1100 rpm was used in all cases. On both the Brookfield and Hercules scales, the desired lower viscosity is indicated by a lower value.

TABLE II

| Flocculant (AJS-13) | lb/ton 60–40 | pH | % Solids | Brookfield Cps | % Solids | Hercules dynes |
|---|---|---|---|---|---|---|
| Control | 4.5 | 6.40 | 70.30 | 490.0 | 70.5 | 2.6 |
| (no floc.) | 5.5 | 6.90 | 70.30 | 455.0 |  |  |
| 0.2 lbs/ | 4.5 | 6.39 | 70.35 | 435.0 | 70.5 | 2.6 |
| ton | 5.5 | 7.01 | 70.35 | 397.5 |  |  |
| 0.3 lbs/ | 4.5 | 6.13 | 70.50 | 345.0 | 70.5 | 2.1 |
| ton | 5.5 | 6.14 | 70.50 | 372.5 |  |  |
|  | 6.5 | 6.85 | 70.50 | 331.3 |  |  |
| 0.4 lbs/ | 4.5 | 5.96 | 70.60 | 372.5 | 70.6 | 2.0 |
| ton | 5.5 | 6.83 | 70.60 | 347.5 |  |  |
| 0.5 lbs/ | 4.5 | 6.04 | 70.49 | 375.0 | 70.5 | 2.2 |
| ton | 5.5 | 6.81 | 70.49 | 358.8 |  |  |

The results reported in Table II clearly demonstrate that the use of the flocculants of the invention do not have a detrimental effect on redispersal of the filter cake to obtain a high solids (i.e. 70%) slurry which exhibits low viscosity; by contrast, the prior art would predict that any flocculant which effectively flocculates the clay (mineral) to effect significant improvements in the dewatering operation would interfere with redispersal to such an extent that either (a) a 70% solids slurry could not be obtained or (b) the resulting 70% solids slurry exhibited a viscosity so high as to not be handleable with available pumps and allied equipment.

Further, the results reported in Table II also clearly demonstrate that the use of 0.2–0.3 lbs/ton (0.015–0.0225 active lbs/ton) or more of the flocculants of the instant invention will permit one to obtain the same or lower slurry viscosity while reducing the dosage of the conventional dispersant by at least 1.0 lb/ton, a reduction of about 20%.

I claim:

1. Method of dewatering a mineral slurry, said slurry containing at least 10% or more finely divided mineral solids selected from the group consisting of kaolin clay, calcium carbonate, and calcium sulfate, comprising adding thereto at least about 0.01 pound of a polymer comprising about 50–99 mole percent repeating units derived from acrylamide and about 1–50 mole percent of repeating units derived from 2-acrylamido-2-methyl propyl sulfonic acid or a water-soluble salt thereof, and wherein said polymer has a Brookfield viscosity of at least 7000 cps in 7.5% aqueous solution, per ton of solids therein to flocculate said solids, and passing the flocculated slurry through a dewatering device to obtain a dewatered product having a solids content of at least 50% and a viscosity greater than 1000 cps, wherein the addition of said polymer is effective in increasing the solids content of said dewatered product and the throughput of said slurry through said dewatering device.

2. Method of claim 1 wherein about 0.01 pound to about 0.25 pound of polymer is added to the slurry per ton of solids therein.

3. Method of claim 1 wherein the polymer comprises 75–99 mole percent repeating units of acrylamide and 1–25 mole percent repeating units of 2-acrylamido-2-methyl propyl sulfonic acid.

4. Method of claim 1 wherein the acrylamide portion of the polymer is partially replaced by about up to about ten mole percent copolymerizable monoethylenically unsaturated monomer.

5. Method of claim 1 wherein the mineral solids are kaolin clay.

6. Method of preparing a high solids kaolin clay slurry from a slurry of about 10% or more kaolin clay comprising adding thereto at least about 0.01 pound of a polymer of 50–99 mole percent acrylamide and about 1–50 mole percent 2-acrylamido-2-methyl propyl sulfonic acid or a water-soluble salt thereof, wherein said polymer has a Brookfield viscosity of at least 7000 cps in a 7.5% aqueous solution, per ton of clay therein, to flocculate said clay, passing the flocculated slurry through a dewatering device to obtain a dewatered product having a solids content of at least 50% and a viscosity greater than 100 cps, wherein the addition of said polymer is effective in increasing the solids content of said dewatered product and the throughput of said slurry through said dewatering device, and dispersing the dewatered product to obtain a slurry having a final solids content greater than 60%.

7. Method of claim 6 wherein about 0.01 pound to about 0.25 pound of polymer is added to the slurry per ton of solids therein.

8. Method of claim 6 wherein the polymer comprises about 75–99 mole percent repeating units of acrylamide and 1–25 mole percent repeating units of 2-acrylamido-2-methyl propyl sulfonic acid.

9. Method of claim 6 wherein the acrylamide portion of the polymer is partially replaced by up to about ten mole percent of copolymerizable monoethylenically unsaturated monomer.

10. Method of claim 6 wherein an effective amount of dispersing agent is added to the dewatered product in the redispersing step.

11. Method of claim 10 wherein the dispersing agent is polyacrylic acid.

12. Method of claim 6 wherein additional kaolin clay is added to the dewatered product in the dispersing step to increase the solids content of the slurry.

* * * * *